UNITED STATES PATENT OFFICE.

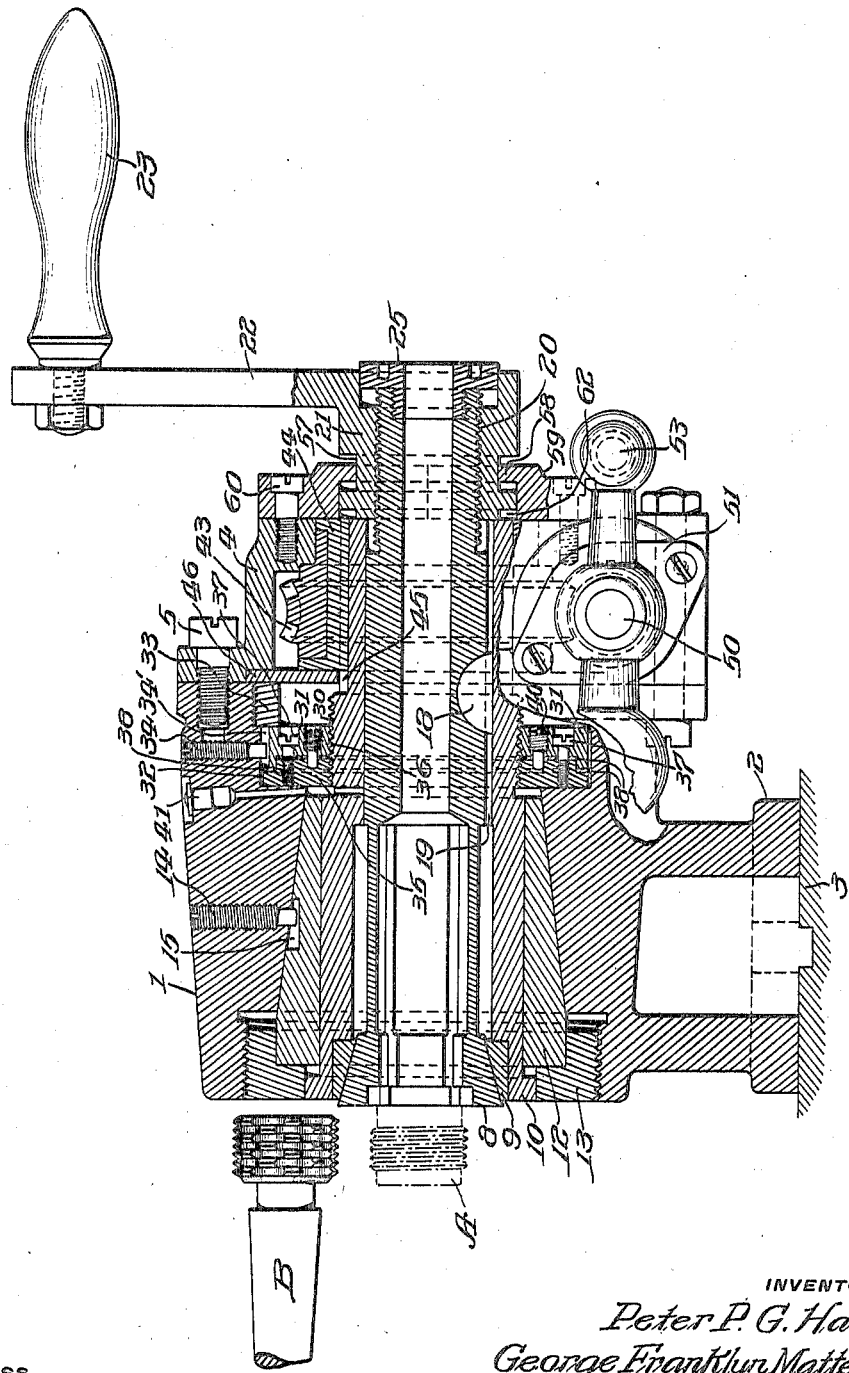

PETER P. G. HALL, OF PHILADELPHIA, PENNSYLVANIA, AND GEORGE FRANKLYN MATTESON, OF ROCKYHILL, CONNECTICUT.

THREAD-MILLING FIXTURE.

1,232,296.  Specification of Letters Patent.  Patented July 3, 1917.

Application filed November 18, 1916. Serial No. 131,997.

*To all whom it may concern:*

Be it known that we, PETER P. G. HALL and GEORGE FRANKLYN MATTESON, citizens of the United States, and residents, respectively, of the city of Philadelphia, county of Philadelphia, and State of Pennsylvania, and of Rockyhill, county of Hartford, and State of Connecticut, have invented a certain new and useful Thread-Milling Fixture, of which the following is a specification, reference being had to the accompanying drawing.

Among the principal objects of our invention are to provide a machine or fixture by means of which screw threads may be rapidly and accurately cut by the use of an ordinary milling machine provided with a suitable cutter; and to provide a fixture by means of which a smooth and continuous feed may be imparted to the work with relation to the cutter and which shall comprise a quick return motion for withdrawing the work in the opposite direction.

Further objects of our invention are to provide a fixture suitable for milling threads, by the use of an ordinary milling machine, which shall comprise means for compensating any wear between the parts of the fixture which might otherwise result in inaccurate production of the threads upon the work.

Still further objects of our invention are to provide a thread milling fixture having the foregoing characteristics which shall be simple in construction and not liable to get out of order; which may be rapidly and economically operated by ordinary machine tool hands and by means of which substantially absolute accuracy in the formation of the threads upon the work may be obtained.

Our invention further includes all of the other various novel objects and features of construction and arrangement hereinafter more definitely specified and described.

We have in the accompanying drawing, illustrated one embodiment of our invention, said drawing showing a central vertical section through the fixture with certain parts in elevation for the sake of clearness, a milling cutter suitable for certain classes of work being also shown in elevation to assist in the description of our invention.

Referring to the drawing, that form of our invention shown therein comprises a substantially barrel-shaped housing 1 provided with an integral base 2 adapted to be bolted or otherwise secured upon the table 3 of an ordinary milling machine, so that it may be moved with the table when desired. The housing at its rear end carries a suitable gear case 4 which is secured to the housing by means of a plurality of suitably disposed machine screws 5 passing through a peripheral flange with which the gear case is provided and which abuts against the rear face of the housing. For holding the work A, which is typically indicated in dotted lines, and which may of course be of varying forms, a suitable split collet 8 extends centrally through the housing and is arranged at its forward end, that is the end adjacent the work, for engagement with a tapered collet bushing 9 supported in and surrounded by the forward end of the collet sleeve 10, hereinafter more particularly described, which in turn is supported in a split taper bearing 12 positioned within the housing and maintained therein by means of a chamfered collet sleeve bearing nut 13 threaded into a suitable aperture at the forward end of the housing, the taper bearing being prevented from axial rotation by means of a set screw 14 extending through the wall of the housing and into a slot 15 in the exterior of the bearing thus permitting the longitudinal movement of the bearing by means of nut 13 when desired to accomplish its diametrical adjustment.

For the purpose of preventing relative rotation between the collet and the collet sleeve while permitting the relative longitudinal movement of these parts, the former, which extends entirely through the housing and gear case and projects for a considerable distance beyond the latter, is provided with a Woodruff or other suitable key 18 engaging in a longitudinally extending keyway 19 in the collet sleeve, which latter terminates substantially flush with the rear face of the gear case 4. The rear end of the collet is externally threaded as at 20 for the reception of the internally threaded hub 21 of crank 22 having a convenient handle 23, and the forward end of the hub is arranged to engage against the rear end of the collet sleeve so that the rotation of the crank in a clockwise direction will serve to draw the collet into the tapered bushing 9 to clamp the work A in the collet, it being understood of course that the jaws of the latter are suitably designed for gripping the particular form of work upon which it is desired to mill the thread. For preventing the collet from being accidentally unscrewed from the crank, the end of the collet is provided with a suitable flanged button 25 which, however, is arranged to be removed when desired to permit the withdrawal of the collet from the fixture.
For the purpose of governing the longitudinal movement of the collet sleeve and of imparting to it a progression equal to the pitch of the thread which it is desired to cut or produce upon the work, the exterior of the collet sleeve is provided with a very accurately cut master thread 30 which is engaged by a compound lead nut 31, hereinafter more specifically described, positioned within a recess 32 of slightly greater diameter than the nut in the rear end of the housing and maintained therein by an annular clamping nut 33 threaded into the recess and abutting against the rear face of the lead nut, the latter being prevented from rotation with respect to the housing by means of a set screw 34 passing through the housing and into a longitudinally extending slot 34' in its periphery. In order to provide means for compensating any wear or lost motion which may occur between the master thread 30 and the lead nut 31, we preferably form the latter in two parts 35 and 36 secured together by a plurality of countersunk screws 37 suitably disposed around the nut, and arranged to draw the parts together, a thin sheet of preferably slightly compressible packing 38 being inserted between the adjacent faces of the parts. A plurality of studs 40 threaded into the part 36 and bearing against part 35 may be operated when desired to force the parts of the nut apart, so that by suitable manipulation of the screws and the studs it is possible to compensate for any wear between the nut and the master thread 30 on the collet sleeve to thereby prevent any relative lost motion and consequent free longitudinal movement of the collet sleeve. A suitable oiler 41 may be arranged for the purpose of lubricating the master thread and the bearing between the collet and the collet sleeve.

For the purpose of imparting to the collet sleeve, and in turn to the collet and the work which it may hold, a relatively slow and steady movement of rotation, means are provided comprising a worm gear 43 keyed to the collet sleeve by a spline key 44 working in a keyway 45 in the latter, the gear being prevented from longitudinal movement in one direction by an annular retaining plate 46 held between the gear case and the housing and in the other by the engagement of the gear with the gear case. For rotating the gear a suitable worm is provided which may preferably be formed with a triple thread of relatively great pitch and positioned on, or integral with, a worm shaft 50 supported in suitable bushings 51 positioned in a depending portion of the gear case 4, one end of the shaft being provided with a suitable ball crank handle 53 by means of which it may be readily rotated to drive the gear 43 and thus impart to the collet sleeve a longitudinal movement with respect to the housing through the engagement of the fixedly held lead nut 31 with the master thread 30 upon the collet sleeve. It will be evident that by the rotation of handle 53 the collet sleeve may be slowly moved in either direction with respect to the housing, and if the pitch of the worm be sufficiently great, as with a triple thread worm, a more rapid movement may be imparted to the collet sleeve by the rotation of the crank 22 thereby affording a quick return movement to the collet sleeve after the actual operation of milling the threads is completed as hereinafter more fully described. Sometimes in practice, however, it is found necessary to give the handle 53 a slight movement of rotation just as the power is applied to crank 22 in order to set the parts in motion as when the worm is at rest a slight locking action often takes place between it and the gear, which, unless the former is given a slight initial movement, prevents the worm from being driven through the gear by rotation of crank 22. With the parts properly designed and well lubricated it is found, however, that this initial movement of handle 53 is generally unnecessary and that the worm can be readily revolved from a state of rest by means of the gear.

In order to limit the amount of longitudinal movement which can be imparted to the collet sleeve under operative conditions and which if exceeded might result in jamming the parts with the risk of injury thereto, as well as for the purpose of forcing the collet forwardly with relation to the collet sleeve when desired, hub 21 may be provided with an annular groove 57 to receive an inwardly projecting flange on a split annular collar 59 surrounding the hub and secured to the gear case 4 by means of screws 60, the hub being reduced in diameter at its forward end to provide a sufficient clearance 62 to permit the hub to follow the collet sleeve into the gear case for a short distance during the thread cutting operation which will now be briefly described as follows:

The fixture having been securely positioned on the bed 3 of a milling machine, crank 22 is rotated in an anti-clockwise direction till the forward side of groove 57 engages flange 58 after which the further rotation of the crank results in forcing the collet forwardly with respect to the collet sleeve until the jaws of the collet are opened sufficiently to allow the entrance of a suitable portion of the work A after which rotation of crank 22 in the opposite direction serves through the engagement of the forward end of hub 21 with the rear end of the collet sleeve to draw the collet into the tapered collet bushing 9 thus clamping the work securely in the former. The milling machine is provided with a suitable revoluble cutter B which may preferably comprise a plurality of preferably V-shaped teeth lying in planes parallel to the longitudinal axis of the cutter, the teeth being suitably formed and sharpened to mill a thread of the cross section desired, as will be readily understood by those familiar with the art, although, if desired, other suitable forms of cutters may be employed. The table 3 is now elevated or otherwise moved to bring the work A into engagement with the already revolving cutter B in such manner that the teeth thereof will enter the work sufficiently to produce a cut of the depth required to form the thread, and handle 53 is then rotated in a clockwise direction until the work has made one complete revolution, a condition which can be easily determined by observing the initial and final positions of the crank 22. As will be readily understood this operation serves to smoothly move the work longitudinally forward with respect to the cutter at a relatively slow rate of speed under the action of the lead nut 31 and master thread 30 for a distance equal to the pitch of the latter, and that in consequence the revolving cutter will have formed upon that portion of the work engaged by it a thread of identically corresponding pitch and of a form determined by the shape of the cutter teeth. The table 3 is now moved away from the work out of engagement with the cutter and crank 22 given a single turn in an anti-clockwise direction, handle 53, if necessary, being simultaneously given a slight twist in a similar direction in order to overcome any locking action between the worm and gear 43 which might otherwise prevent the easy rotation of the crank. It will be evident that the movement of the crank will serve to rapidly withdraw the collet sleeve from the position occupied by it after the completion of the thread upon the work, to the position which it occupied when the work was clamped in the collet, thus saving a very appreciable amount of time from that which would be required to turn the collet sleeve to such position by means of the handle 53, it being understood that so long as the collet sleeve can move freely with relation to the housing it will tend to turn with crank 22 as a unit if the hub 21 has been screwed tightly against the end of the collet sleeve when work A was clamped in the collet.

In practice it has been found most desirable to have the collet sleeve returned to substantially the same position with respect to the housing, and hence to the cutter B, at the beginning of each thread cutting operation in order to produce absolute uniformity in the threads formed on consecutive pieces of work as under such conditions the same set of teeth on the cutter are employed in each thread cutting operation, whereas such desired uniformity might not be obtained were one set of teeth used for a given piece of work and a slightly different set of teeth for another piece of work, as would be the case if the collet sleeve were not returned to the same initial position after each cutting operation, it being understood that it is customary to provide the cutter with a slightly greater number of rows of teeth, as clearly shown in the drawing, than the number of threads it is desired to form upon the work. Hence by the use of the quick return motion just described a very appreciable amount of time can be saved in completing the cycle of operations necessary to form the desired thread on each piece of work. After the collet has been returned to its initial position as described, further rotation of the crank 22 in an anti-clockwise direction serves to engage the forward end of groove 57 with flange 58 and thereafter force the collet forwardly to release the work as hereinbefore described, after which a new piece of work may be inserted and the operations repeated.

It will be evident that by the use of collet sleeves having master threads of various pitches and correspondingly threaded lead nuts, threads having almost any desired pitch, within limits, may be readily milled by the use of our invention, and that any wear taking place between any given lead nut and its collet sleeve and which might result in lost motion between these parts and consequent inaccuracy in the threads formed upon the work may be readily compensated by the adjustment of the parts of the nut while suitable adjustment of the taper bearing 15 surrounding the collet sleeve from time to time may be made to compensate for wear between these parts and thereby preserve the absolute rigidity of the collet sleeve and in turn of work A, a condition most necessary in producing results of the desired accuracy. Furthermore, while we have illustrated by way of example a piece of work A having external threads and a cutter suitable for the formation of such threads, it will be evident that the invention may be used with equal facility in the formation of internal threads upon certain classes of work by the use of a cutter of suitable form as will be readily understood by those familiar with the art.

While we have herein illustrated and described with considerable particularity a preferred embodiment of our invention we do not thereby desire or intend to limit ourselves specifically thereto as various changes and modifications may be made in the details of construction and in the arrangement of the various parts, and the invention may be adapted for varying classes of work or arranged to be driven from a suitable source of power instead of by hand, as required, without departing from the spirit and scope of the invention as defined in the appended claims.

Having thus described our invention we claim and desire to protect by Letters Patent of the United States:

1. A thread milling fixture comprising a housing, means for holding a piece of work to be milled, means for imparting to said work a longitudinal and rotative movement with regard to said housing at a relatively slow speed, and positively driven means for imparting to said work similar movements in reverse direction at a relatively greater speed.

2. A thread milling fixture comprising a housing, means carried by said housing operative to hold a piece of work, means operative to impart to said work-holding means a relatively slow movement of rotation during a given longitudinal progression with regard to said housing, and means operative to impart to said holding means a relatively very rapid movement of rotation during a similar longitudinal progression in a reverse direction.

3. A thread milling fixture comprising a housing, a collet longitudinally movable with respect to said housing and operative to hold a piece of work, a sleeve surrounding said collet and carrying a master thread, a lead nut in fixed operative position with said housing and engaging said thread, means for imparting to said sleeve a rotative and longitudinal movement with respect to said housing at a relatively slow rate of speed and means for imparting similar movements thereto at relatively greater speed in the opposite direction.

4. A thread milling fixture comprising a housing, a collet longitudinally movable with respect to said housing and operative to hold a piece of work, a sleeve surrounding said collet and having a master thread on its exterior, a lead nut in fixed operative relation with said housing and engaging said thread, a worm gear in longitudinal slidable relation with said sleeve, a worm operative to rotate said gear and means operative to rotate said sleeve and said collet by driving said worm through said gear to retract said collet to initial position after the completion of a longitudinal movement thereof.

5. A thread milling fixture comprising a housing, a collet longitudinally movable in said housing and operative to hold a piece of work, a sleeve surrounding said collet and having a master thread, an adjustable bushing forming a bearing for said sleeve, a nut in fixed operative relation with said housing and engaging said master thread, a worm and worm gear operative to rotate said sleeve and means comprising a crank having a grooved hub and a flanged member engaging said groove operative to move said collet longitudinally of said sleeve and independently thereof.

6. A thread milling fixture comprising a housing, a collet longitudinally movable within said housing and operative to hold a piece of work, a sleeve surrounding said collet and adjustably supported in said housing, means to cause a longitudinal movement of said collet with respect to said sleeve, means operative to move said sleeve with respect to said housing at a relatively slow speed, and means comprising said first-mentioned means adapted to cause a movement of said sleeve and said collet with respect to said housing at a relatively greater speed at a predetermined rate of longitudinal progression.

7. A thread milling fixture comprising means for holding a piece of work, means operative to feed said work to a cutter at a relatively slow rate of speed and with a given longitudinal progression with respect to said cutter which revolves in a fixed position, and means comprising said feeding means operative to impart to said work a quick return movement in the opposite direction at a relatively greater speed than that at which the work is fed to the cutter.

8. A thread milling fixture comprising a housing, a work-holding collet longitudinally movable with respect to said housing, a sleeve surrounding said collet and having a master thread, an adjustable taper bearing supporting said sleeve with respect to said housing, a master thread on the exterior of said sleeve, a lead nut having relatively adjustable portions engaging said master thread and supported in fixed operative relation with said housing, means operative to move said collet with respect to said sleeve, and means operative to rotate said collet and said sleeve at a relatively slow speed, said first-mentioned means being adapted to cause the rotation of said collet and said sleeve with respect to said housing at a relatively greater speed.

9. In a thread milling fixture, the combination with a work-holding collet, of a sleeve surrounding said collet, a crank having an interiorly threaded hub engaging said collet, and means comprising a member engaging said hub operative to cause the longitudinal movement of said collet with respect to said sleeve when said crank is rotated with respect thereto.

10. A thread milling fixture comprising a housing, a work-holding collet longitudinally movable with respect to said housing and having an exteriorly threaded end portion, a crank having an interiorly threaded hub engaging said end portion, a sleeve surrounding said collet and supported in said housing one end of said sleeve being operative to engage the end of said hub, and means comprising a flanged member cooperative with said hub to cause the longitudinal movement of said collet with respect to said sleeve upon the rotation of said crank with respect to said sleeve.

11. A thread milling fixture comprising a housing, a work-holding collet, a sleeve surrounding said collet, an adjustable bearing supporting said sleeve in said housing, a master thread on the exterior of said sleeve, a nut having relatively adjustable parts in fixed operative relation with said housing and engaging said thread, a worm gear surrounding said sleeve and longitudinally slidable with respect thereto, a worm operative to rotate said gear to move said sleeve longitudinally of said housing, means operative to cause the longitudinal movement of said collet with respect to said sleeve and means whereby a quick return movement longitudinally of said housing may be imparted to the collet and the sleeve as a unit.

12. In a thread milling fixture, the combination with a housing, of a collet adapted to hold the work to be milled, a sleeve surrounding said collet, a housing adjustably supporting said sleeve in said housing, a master thread on the exterior of said sleeve, a nut having relatively adjustable parts operatively supported in said housing and engaging said thread, means operative to cause relative longitudinal movement of said collet and said collet sleeve, and means operative to cause the simultaneous rotation of said collet and said sleeve in said nut.

13. In a thread milling fixture, the combination of means for holding a piece of work, means for moving said work at a relatively slow rate of speed and with a predetermined pitch past a cutter revolving in a fixed position, and means for moving said work in the opposite direction at a relatively greater speed and with the same pitch.

14. In a thread milling fixture, the combination of means operative to hold a piece of work, means comprising a lead nut and a lead screw operative to move said work from a given initial position with a relatively slow rotative movement and with a predetermined longitudinal progression, and means comprising said nut and said screw operative to return said work to said initial position at a relatively greater speed of rotation with the same longitudinal progression.

In witness whereof, we have hereunto set our hands this 16th day of November, A. D., 1916.

PETER P. G. HALL.
GEORGE FRANKLYN MATTESON.